US008829409B2

(12) United States Patent
Wadsworth (10) Patent No.: US 8,829,409 B2
(45) Date of Patent: Sep. 9, 2014

(54) ULTRA-HIGH SPEED IMAGING ARRAY WITH ORTHOGONAL READOUT ARCHITECTURE

(71) Applicant: Mark Wadsworth, Georgetown, TX (US)

(72) Inventor: Mark Wadsworth, Georgetown, TX (US)

(73) Assignee: Thermo Fisher Scientific Inc., Waltham, MA (US)

( * ) Notice: Subject to any disclaimer, the term of this patent is extended or adjusted under 35 U.S.C. 154(b) by 143 days.

(21) Appl. No.: 13/648,741

(22) Filed: Oct. 10, 2012

(65) Prior Publication Data

US 2014/0097329 A1    Apr. 10, 2014

(51) Int. Cl.
*H01L 27/00*    (2006.01)
*H04N 3/14*    (2006.01)

(52) U.S. Cl.
USPC ........................................ 250/208.1; 348/308

(58) Field of Classification Search
CPC .. H01L 27/14609; H04N 5/341; H04N 5/347; H04N 5/374; H04N 5/3742; H04N 5/37457
USPC ........................................ 250/208.1; 348/308
See application file for complete search history.

(56) References Cited

U.S. PATENT DOCUMENTS

| 6,297,488 | B1 | 10/2001 | Beraldin et al. | |
|---|---|---|---|---|
| 6,831,263 | B2 | 12/2004 | Skurnik et al. | |
| 7,728,297 | B2 | 6/2010 | Masafumi | |
| 2011/0304758 | A1* | 12/2011 | Eldesouki et al. | 348/308 |

OTHER PUBLICATIONS

Herman J. Woltring, "Single- and Dual-Axis Lateral Photodetectors of Rectangular Shape," IEEE Transactions on Electron Devices, 1975, pp. 581-590.
Petersson et al., "Position Sensitive Light Detectors with High Linearity," IEEE Journal of Solid-State Circuits, vol. SC-13 (3), 1978, pp. 392-399.
David L. Standley, "An Object Position and Orientation IC with Embedded Imager," IEEE Journal of Solid-State Circuits, vol. 26 (12), 1991, pp. 1853-1859.
Maekynen et al., "A CMOS Binary Position-Sensitive Photodetector (PSD) Array," IEEE 1997 Custom Integrated Circuits Conference, pp. 279-282.
Kleinfelder et al., "A 10 000 Frames/s CMOS Digital Pixel Sensor," IEEE Journal of Solid-State Circuits, vol. 36 (12), 2001, pp. 2049-2059.
Massari et al., "High Speed Digital CMOS 2D Optical Position Sensitive Detector," 28th European Solid-State Circuits Conference, Italy, ESSCIRC 2002, 723-726.
Etoh et al., "An Image Sensor Which Captures 100 Consecutive Frames at 1 000 000 Frames/s," IEEE Transactions on Electron Devices, vol. 50 (1), 2003, pp. 144-151.

(Continued)

*Primary Examiner* — Thanh Luu
(74) *Attorney, Agent, or Firm* — Michael C. Staggs (57) ABSTRACT

A plurality of unit pixels in a two dimensional imaging array are arranged in a manner that signal charges along a given row are added to other relevant signal charges of the same row. Signal charges along a given column are added to other relevant signal charges of the same column. Summed charge values are output simultaneously from rows and columns to produce one row and one column of image data. The resulting summed data is temporarily stored in on-chip buffers and then output from the chip during the integration time of the next imaging cycle with no loss in imaging duty cycle.

18 Claims, 7 Drawing Sheets

(56) References Cited

OTHER PUBLICATIONS

Massari et al., "A Fast CMOS Optical Position Sensor with High Subpixel Resolution," IEEE Transactions on Instrumentation and Measurement, vol. 53 (1), 2004, pp. 116-123.

Nishikawa et al., "A High-Speed CMOS Image Sensor with On-chip Parallel Image Compression Circuits," IEEE 2007 Custom Intergrated Circuits Conference (CICC), pp. 833-836.

El-Desouki et al., "CMOS Image Sensors for High Speed Applications," Sensors 2009, 9, pp. 430-444.

* cited by examiner

ULTRA-HIGH SPEED IMAGING ARRAY WITH ORTHOGONAL READOUT ARCHITECTURE

BACKGROUND OF THE INVENTION

1. Field of the Invention

The present invention relates to the field of imaging sensors. More particularly, the present invention relates to an image sensor configured to sum signal information from pixels in the imaging array thereby producing a resultant that includes one row and one column of image data that are thereafter output in a desired manner during the integration time of the next imaging cycle with no loss in imaging duty cycle.

2. Discussion of the Related Art

Conventional imagers and imaging systems exist for ultra-high speed photography, realizing image collection at 1 million frames per second and greater. These systems use imaging arrays constructed from a plurality of photosensitive unit pixels which convert incident photons into charges.

Figure 1:
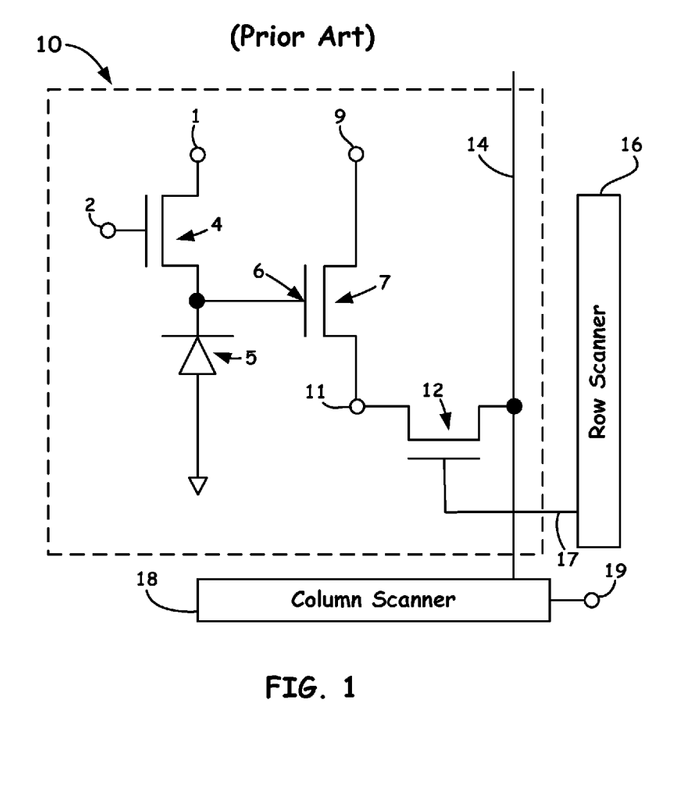
FIG. 1 is the schematic circuit representation of a prior art sensor pixel that is incorporated into an array whose scanning and addressing circuits are shown only in a block diagram.

A conventional image sensor converts incident photons into electrons that are collected during an image integration interval and stored in sensor pixels. After an integration interval is complete, the collected charge is converted into an electronic signal, for example a voltage, which is output from each pixel via a regular, repetitive readout cycle. Many pixel architectures have been described in the literature, each performing the same basic function of conversion of collected signal photons to an electronic signal and the subsequent output of the signal information from the imaging device in a controlled fashion. FIG. 1 is an example of a diagram for one typical variety of an image pixel, generally designated by the reference character 10. Important to the understanding of the embodiments herein is that each such pixel circuit comprises an individual image sensor that is a as part of an array that as an arrangement, forms a two-dimensional imaging array of dimensions "n" by "m." Thus, each pixel in such an arrangement enables charge to be integrated on a capacitive element, in this case a reverse-biased diode 5 whose capacitance also serves to convert a charge to voltage. The Field Effect Transistor (FET) 4, as shown in FIG. 1, operates as a switch to periodically reset the bias on diode 5 to a level applied to FET diffusion lead 1 upon a clock pulse being applied to the gate 2 input of FET 4. Diode 5 is also shown connected to a gate to of an FET 7. A supply bias (not shown) to FET 7 is applied through the drain 9 of FET 7 while the source 11 of FET 7 is connected through an addressing FET 12 additionally coupled to an array column sense line 14. The column sense line 14 is designed to be shared with other pixels (not shown) coupled to the same column, wherein a line of interest can be desirably selected by utilization of a row scanner 16 applying timed pulses along line 17 to the gate of FET 12. As a general method of operation, the collection of incident signal charge resultant on diode 5 induces a change of the source voltage 11 resultant on FET 12 that is transferred to column sense line 14 and further through the column scanner 18 to the sensor output 19.

Depending upon the architecture of the imaging array, photo-generated charge during each frame may be output via the imaging system at very high data rates or stored on-chip. On-chip storage typically enables the collection and storage of multiple frames of data in the imaging chip for later output at standard video frame rates, for example.

For ultra-high speed applications however, the performance of conventional imagers and imaging systems such as that shown in FIG. 1 suffers because all pixels in the imaging array must be output to obtain the information contained in the full scene. To illustrate, a two-dimensional imaging array of dimensions "n" pixels by "m" pixels requires a total of "n*m" pixels to be output to obtain the complete image. This constitutes a problem of time required for image readout, and hence, for the speed at which successive images can be collected by the imaging array.

For current state-of-the-art imaging arrays with no on-chip data storage, the rate at which successive images can be collected is limited by the time required to completely output the captured image from the imaging system. Without on-chip memory a successive image frame can be collected while the previous frame is read out; however, the first image frame must be completely output from the device before the next frame can be output. Hence the time between successive frames is controlled by the output rate of the imager. An exemplary device in which the time between successive collected images is limited by the total readout time of the imager is described in the article "A 10,000 Frames/s CMOS Digital Pixel Sensor" by Stuart Kleinfelder, et.al. *IEEE J. Solid State Circuits,* 2001, Vol. 36, No. 12, 2049-2058.

For current state-of-the-art imaging arrays with multiple frame on-chip data storage capability, the rate at which sequential image scenes are collected is not limited by the readout rate. However, the image duty cycle, that is, the percentage of total time in which the imaging device is available to actively collect signal from the image scene, is limited by the total readout time. A device with on-chip data storage may be capable of gathering sequential images in bursts of very short time intervals. However, once the on-chip memory is full the device must read out the stored data. During that readout time the imager is unable to collect and store new image data until the on-chip memory is read and becomes available for use once more. An exemplary device in which the image frame rate is not limited by the rate of image readout, but the image duty cycle is limited by the total readout time is described in the article "CMOS Image Sensors for High Speed Applications" by Munir El-Desouki, et.al. *Sensors* 2009, 9 430-444.

SUMMARY OF THE INVENTION

Signal information, as utilized by the configured sensor herein, can be obtained from an acquired image by evaluating data that has been highly compressed by means of image processing. In particular, the array sensors disclosed herein enable the collapsing of a two-dimensional image into two lines of one-dimensional data: one line for the x-dimension (referred to as row) and one line for the y-dimension (referred to as column). The two resulting data lines are the summed information for all pixels in each column and each row, respectively. These lines of summed data can be used to obtain the information from the full two-dimensional image. As a novel application of the present embodiments disclosed herein, for photon counting applications under the condition where only a few photons impinge upon an imaging array during an integration interval, the two summed data lines can provide sufficient information for a complete image reconstruction, including both positional and intensity data. The key herein is that for a two-dimensional imaging array of dimensions "n" by "m", the number of required signal output cycles is reduced to a total of "n+m" as compared to a total of "n*m" for a state-of-the-art imaging device.

A first aspect of the present embodiments thus includes an image sensor that includes an array of sensor pixels having columns and rows, each pixel including, a photosensitive region detecting an image, a region integrating and storing the image, circuitry for providing two identical output signals from each pixel in the array, a column converting circuit configured to sum the output signals from each of the pixels common to each column in the imager, respectively, into a one-dimensional column data signal with one data entry per column; a row summing circuit configured to simultaneously with the column converting circuit, sum the output signals from each of the pixels common to each row in the imager respectively, into a one-dimensional row data signal with one data entry per row; storage registers capable of temporarily storing the summed signal data for both the row and column sums; and circuitry controlling the output of the summed signals off-chip.

A second aspect of the present embodiments includes a system that includes: an optical multiplier configured to receive an incident optical signal indicative of an image so as to generate an amplified optical signal; an array of sensor pixels having rows and columns and configured to receive the amplified optical signal so as to generate electrical signals corresponding to the amplified optical signal, wherein each pixel further comprises; a photosensitive region for detecting incident light; a region for integrating and storing the incoming optical signal; circuitry for converting the optical signal into an electrical output; and circuit means for providing two identical output signals from each pixel in the sensor array, a column converting circuit configured to sum the output signals from each of the pixels common to each column in the imager, respectively, into a one-dimensional column data signal with one data entry per column; a row summing circuit configured to simultaneously with the column converting circuit, sum the output signals from each of the pixels common to each row in the imager, respectively, into a one-dimensional row data signal with one data entry per row, storage registers capable of temporarily storing the summed signal data for both the row and column sums; wherein the signal and row signal are indicative of a captured image; circuitry controlling the readout of the summed signals, and a processor configured to subject recorded spatial and temporal properties of the optical signals received by said array to deconvolution so as to extract the spectral content in the captured image.

Accordingly, the sensor described herein outputs the optically-generated signal from the unit pixels after is scene integration interval, such as, but not limited to, ion data received at the end of a configured mass ion quadrupole. Each unit pixel outputs its signal and, simultaneously, creates a summation of that signal with all of the signals of all other unit pixels in commonality within that row. An on-chip storage register captures and holds the information from all rows until after readout of the information has occurred. Concurrently, each unit pixel outputs its signal and creates a simultaneous summation of that signal with all of the signals of all other unit pixels in commonality with that column. An on-chip storage register captures and holds the information from all columns until after readout of the information has occurred.

Desirably, each of the configured on-chip storage registers is mediated by multiplexing devices which control the output of the summed signal(s) off-chip by the application of appropriate clocking sequences. The output signal comprises the complete output of the two on-chip storage registers.

DETAILED DESCRIPTION

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Figure 2:
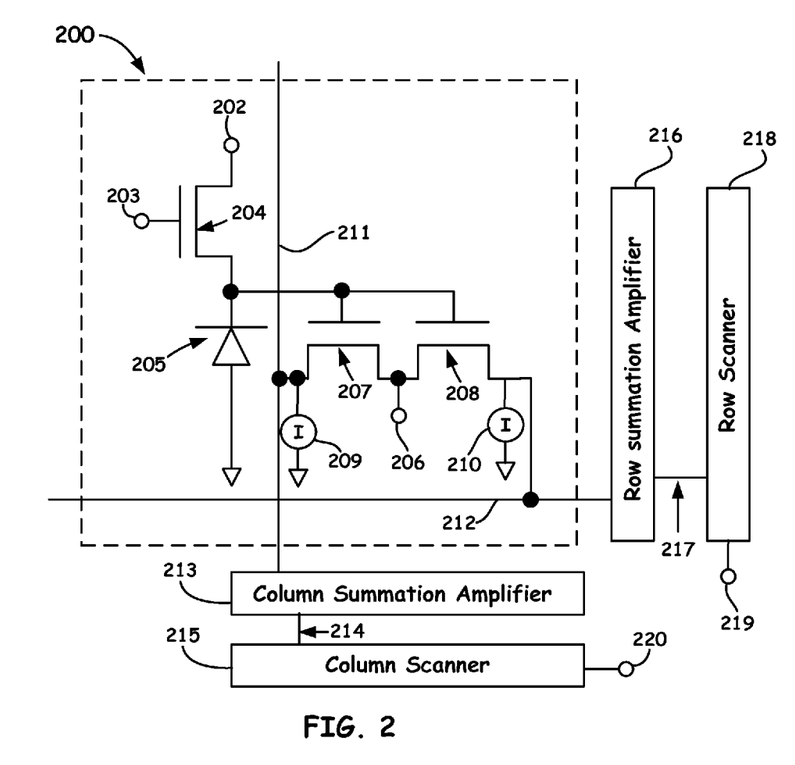
FIG. 2 is the schematic circuit representation of an embodiment of a pixel of the present invention that is incorporated into an array hose scanning and addressing circuits are shown only in a block diagram.

Turning now to the drawings, FIG. 2 is an exemplary novel circuit diagram of a representative pixel 200 with block diagram representations of column summation 213 and row summation 216 amplifier circuits, and selecting circuitry, such as, but not limited to, a column scanner 215 as well as a row scanner 218 circuit. Similar to the circuit FIG. 1 discussed above, charge integrates on the reverse-biased diode 205, whose capacitance also serves to convert charge to voltage. Such diodes 205 being photodiodes can also be configured as avalanche photodiodes (internal semiconductor amplifier) to increase carrier density. Diode 205 may also be replaced by an MOS capacitor (commonly known as a photogate), a buried photodiode structure, or any electronic elements which act as a photosite in a semiconductor device. Field-effect transistor (FET) 204 acts as a switch which periodically resets the bias on diode 205 to the level applied to FET diffusion 202 by means of a clock pulse applied to gate 203. Diode 205 is also connected to the parallel combination of the gates of FETs 207 and 208. Power for both of the FETs is applied to 206. The source of FET 207 is connected to a current source 209 to the array column sense line 211. It is important to note the beneficial aspect of the outputs of the FET's 207 and 208 both being tied into a column and a row for summation at the end of an integration period. Thus, the column sense 211 line is shared with other pixels of the same column, the outputs of which are summed together by the column summation amplifier 213. The source of FET 208 is connected to a current source 210 as well as to the array row sense line 212. The row sense line 212 is shared with other pixels of the same row, the outputs of which are summed together by the row summation amplifier 216. The change of source voltage of FET 207 is identical to that of source voltage of FET 208, and is induced by the collection of incident signal charge in the pixel on 205. The summed outputs from the column are transferred to column read line 214 and further directed through the column scanner 215 to the sensor output 220. The summed outputs from the row are thus transferred to row read line 217 and further through the row scanner 218 to the sensor output 219.

Figure 3:
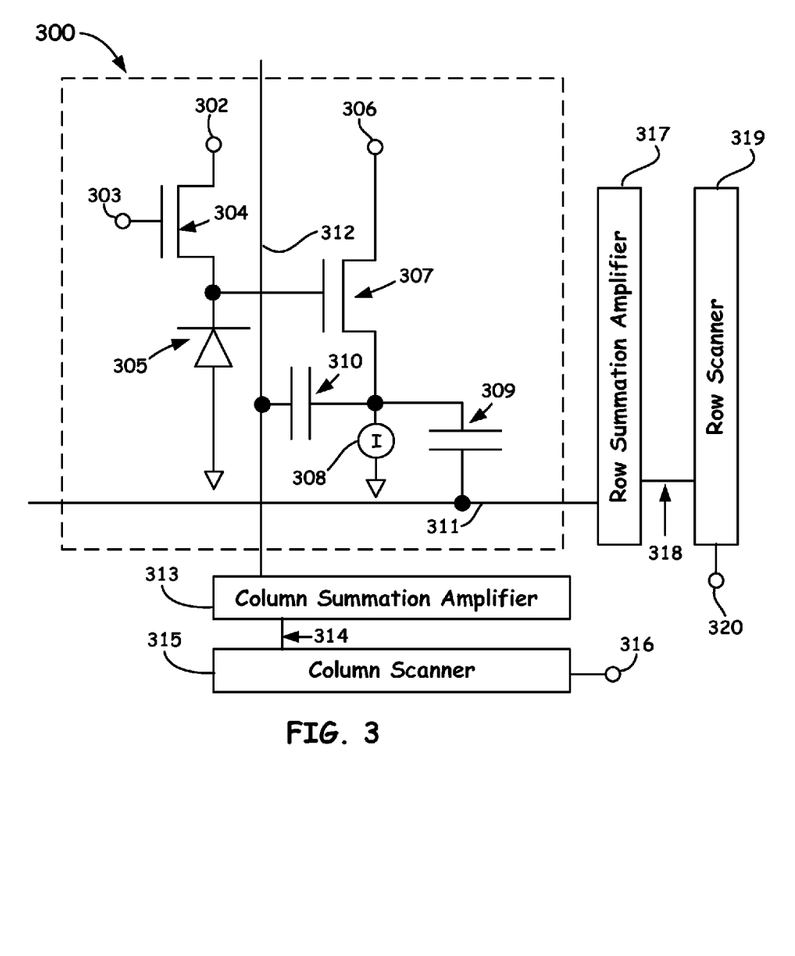
FIG. 3 is the schematic circuit representation of an alternate embodiment of a pixel of the present invention that is incorporated into an array whose scanning and addressing circuits are shown only in a block diagram.

FIG. 3 illustrates an alternate beneficial circuit diagram of a representative pixel 300 with block diagram representations of column summation 313 and row summation 317 amplifier circuits and selective circuitry such as, but not limited to, a column scanner 315 and a row scanner 319 circuit. Charge integrates on the reverse-biased diode 305, which can also be configured as avalanche photodiode to increase carrier density whose capacitance also serves to convert charge to voltage. Diode 305 may also be replaced by an MOS capacitor (commonly known as a photogate), a buried photodiode structure, or any electronic elements which ct as a photosite in a semiconductor device. FET 304 acts as a switch which periodically resets the bias on diode 305 to the level applied to FET diffusion 302 by means of a clock pulse applied to gate 303, as known to those skilled in the art. Diode 305 is also connected to the gate of FET 307. Power for FET 307 is applied to 306. It is important to note that there are now two capacitors 309 and 310 in FIG. 3 that are beneficially coupled into one amplifier unlike the circuitry of FIG. 2. In particular, the source of FET 307 is connected to a current source 308 and additionally to one plate of each of two capacitors 309 and 310. The remaining plates of 309 and 310 coupled to the array column sense line 312 and the array row sense line 311, respectively. The column sense line is shared with other pixels of the same column, the outputs of which are summed together by the column summation amplifier 313. Similarly, the row sense line is shared with other pixels of the same row, the outputs of which are summed together by the row summation amplifier 317. The summed outputs from the column summation amplifier are thus transferred to column read line 314 and further through the column scanner 315 to the sensor output 316 via a controller capable of such operations. Moreover, the summed outputs from the row summation amplifier are thus transferred to row read line 318, and further through the row scanner 319 to the sensor output 320.

Figure 4:
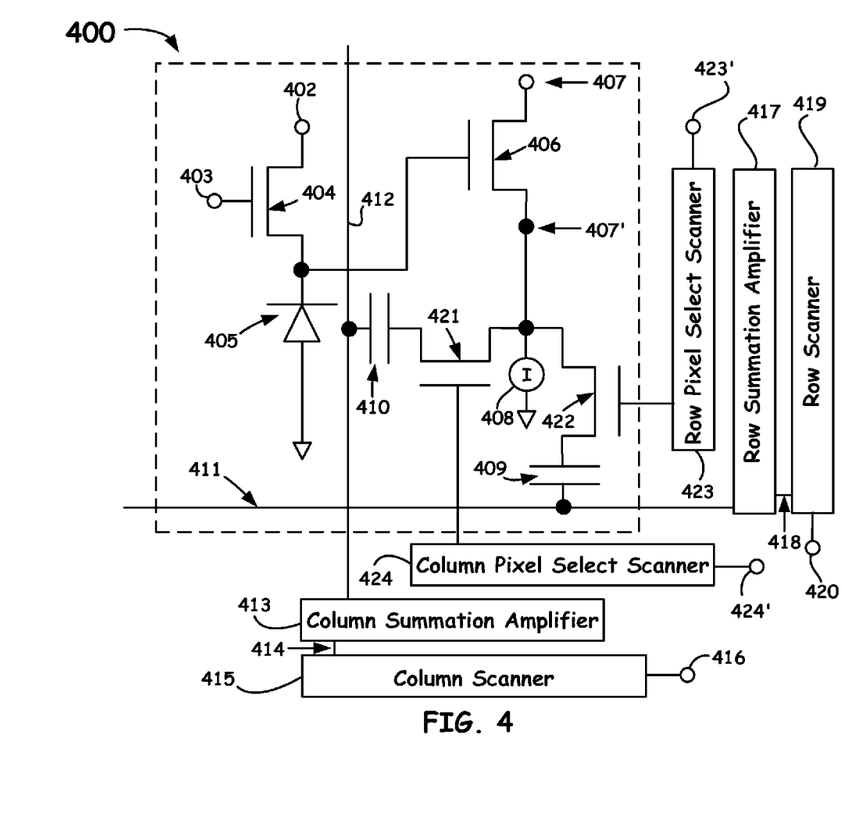
FIG. 4 is a schematic circuit representation of a further beneficial embodiment of a pixel of the present invention that is incorporated into an array whose scanning and addressing circuits are shown only in a block diagram.

FIG. 4 illustrates another alternate beneficial circuit diagram of a representative pixel, as shown referenced by the numeral 400. Such a beneficial pixel further 400 comprises block diagram representations of a column summation 413 amplifier circuit and a row summation amplifier circuit 417 and selective circuitry such as, but not limited to, a column scanner circuit 415, a row scanner circuit 419, a row pixel select scanner circuit 423, and a column pixel select scanner circuit 424. Charge integrates on a reverse-biased diode 405, which can also be configured as avalanche photodiode to increase carrier density whose capacitance also serves to convert charge to voltage. Diode 405 may also be replaced by an MOS capacitor commonly known as a photogate), a buried photodiode structure, or any electronic elements as known to those skilled in the art, which act as a photo-site in a semiconductor device. FET 404 acts as a switch which periodically resets the bias on diode 405 to the level applied to FET diffusion connector 402 by means of a clock pulse applied to gate 403, as known to those skilled in the art. Diode 405 is also coupled to the gate of FET 406. Power for FET 406 is applied to 407.

It is important to note in FIG. 4 that in addition, to two capacitors 409 and 410, there are two selection FETs 421 and 422 that control the pixel output to the summation amplifiers 413 and 417. The source of FET 406 is coupled (e.g., see reference character 407') to a current source 408 and additionally to the source nodes of select FETs 421 and 422, which in turn couple to one plate of each of two capacitors 409 and 410. The remaining plates of 409 and 410 couple to an array column sense line 412 and an array row sense line 411, respectively. The column sense tine 412 is shared with other pixels of the same column, the outputs of which are summed together by the column summation amplifier 413. Similarly the row sense line 411 is shared with other pixels of the same row, the outputs of which are summed together by the row sum illation amplifier 417. The row pixel select scanner 423 (as directed via input 423') provides control over which of the pixels in each column are selected to be part of the summed output, and furthermore controls whether the summation is performed simultaneously in a parallel manner or in a pixel by pixel scanned manner. The column pixel select scanner 424 (as directed via input 424') provides control over which of the pixels in each row are selected to be part of the summed output, and furthermore controls whether the summation is performed simultaneously in a parallel manner or in a pixel by pixel scanned manner. The summed outputs from the column summation amplifier are thus transferred to column read line 414 and further through the column scanner 415 to the sensor output 416 via a controller capable of such operations. Moreover, the summed outputs from the row summation amplifier 417 are thus transferred to row read line 418, and further through the row scanner 419 to the sensor output 420.

Figure 5:
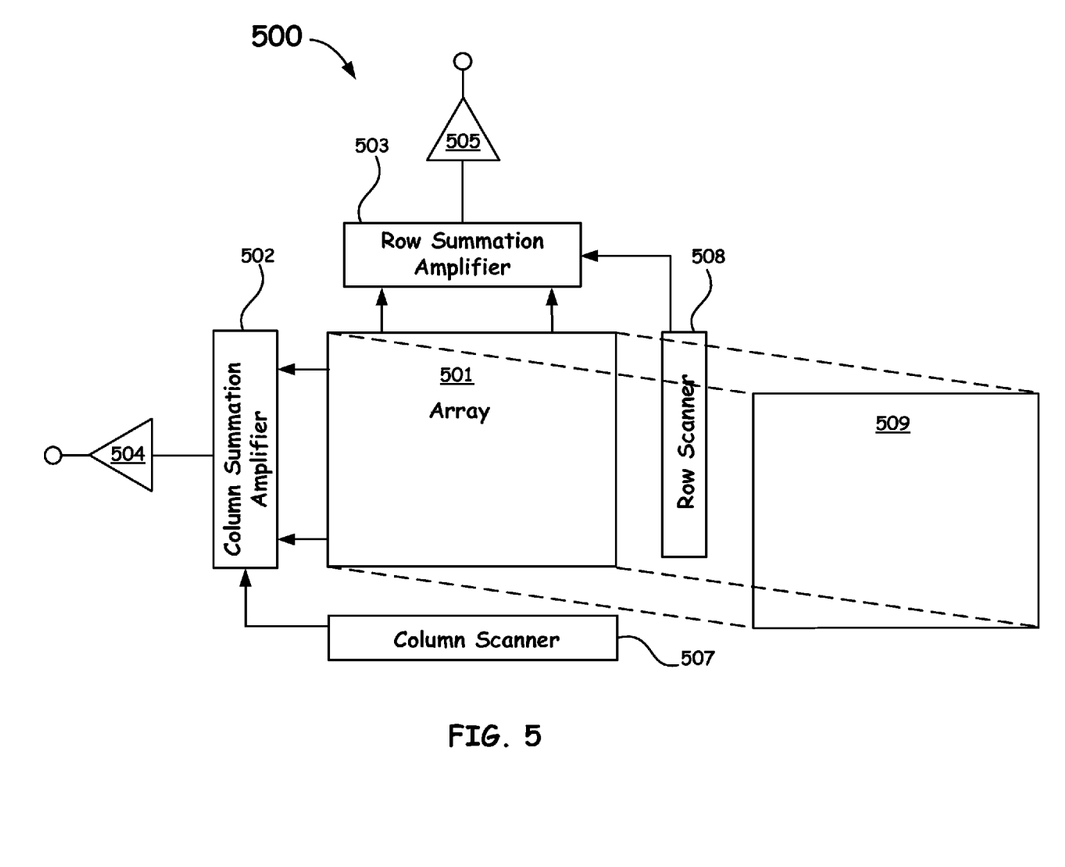
FIG. 5 is a functional block diagram of the image sensor disclosed herein.

FIG. 5, as referenced by the numeral 500, illustrates a beneficial and functional block diagram of an imaging system of the present embodiments. FIG. 5 thus generally illustrates an imaging system 500 comprised of an array of pixels 501, wherein an individual pixel can be configured as shown in FIG. 2, FIG. 3, FIG. 4 or other configurations allowing for the formation of a summed column line and a summed row line output as discussed above. The array 501 of such pixels thus receives an image and generates collectively an electrical embodiment of a scene integration that is very beneficial to where only a few photons impinge upon the imaging array 501 but wherein such photons are inclusive of useful information (e.g., the photon converted output of a mass spectrometer quadrupole or the collection of photons related to astronomical observations).

As shown in FIG. 5, a row register, such as a row summation amplifier circuit 503, thus receives a row data line while a column register, such as a column summation amplifier circuit 502 receives a column data line. Selecting circuitry, such as, but not limited to column scanner 507 and row scanner 508 couples to the row register and column registers generally described above. For each image, the selecting circuitry (e.g., column scanner 507 and row scanner 508) controls outputting a row data line and a column data line simultaneously. The respective elements within the row data line and the column data line may be optionally weighted. As also shown in FIG. 5, output amplifiers 504 and 505 provide the interface of the summed information to the outside world so as to provide useful time and importantly, sparse spatial information.

In operation, signal information is thus obtained from the image by evaluating data by collapsing a two-dimensional image into two data lines of one-dimensional data: a row data line includes x-dimension data and a column data line includes y-dimension data. The row and column data lines are the summed information for all pixels in each column and each row, respectively. These lines of summed data can be used to obtain the information from the full two-dimensional image.

For example, as stated above, the present embodiments are very beneficial for photon counting applications under the condition where only a few photons impinge upon the imaging array (e.g., the output of a mass spectrometer quadrupole) during an integration interval. Specifically, the two summed data lines provide sufficient information for a complete image reconstruction, including both positional and intensity data. To reiterate for a two-dimensional imaging array of dimensions "n" by "m", where n is number of rows and m is the number of columns, the number of required signal output cycles is reduced to a total of "n+m" as compared to a total of "n*m" for a state-of-the-art imaging device.

To provide further details of the present embodiments, at the beginning of a data gathering cycle, charge is cleared from the imaging array 501 via known methods in the art and incoming photons are allowed to collect in the two-dimensional m×n photoactive array of pixels 501. At the end of the image gathering cycle, a representation of "a" signal collected in each pixel, such as a pixel shown in FIG. 3 or FIG. 4 discussed above, of array 501 is summed in both the horizontal direction and the vertical direction in a row-by-row and column-by-column fashion. To output the summed signal information, column scanner 507 and row scanner 508 are enabled. The summed output corresponding to the selected row and column then become available at the output of the chip, 504 and 505, for readout. The scanners 507 and 508 can then be incremented, if desired and additional rows and columns can be read. in the most standard mode of operation, the scanners are incremented and the readout process is repeated until all m rows and all n columns are read from the chip. In this manner a full readout of the array can be seen to consist of m+n reads, as compared to a standard imaging device which requires the product of m and n read for complete readout.

The embodied system, as stated above, is most useful in situations where very few photons are present in the incoming scene. FIG. 5 also shows a photomultiplier device 509 in the signal path (i.e., in front of the array). This photomultiplier 509 can be any device that provides amplification, of incident photons. A typical photomultiplier example is a microchannel plate or any other photomultiplier known to those skilled in the art. The photomultiplier or microchannel plate thus creates a packet of photons for other detectable particles such as electrons) for each incident photon. In this way the size of the signal generated by a single photon can be increased to a level above the noise floor of the device 500, thereby allowing for unambiguous detection of single photons.

An alternative to providing amplification before the array can also be by way of internal carrier amplification, e.g., an avalanche multiplier, a photon amplifier, etc., configured within the example pixels of FIG. 2, FIG. 3, and FIG. 4. This also ensures an increase in signal-to-noise for ease of detection of desired signals. One or more frame buffers may also be provided for outputting data to a display. In addition, as part of the overall design, circuitry can be configured for addressing and outputting the summed electrical signal from each row in parallel for readout off-chip and/or for addressing and outputting the summed electrical signal from each row in a sequential fashion for readout off-chip.

Mass Quadrupole Example Application in Use with Detector Array

Figure 6:
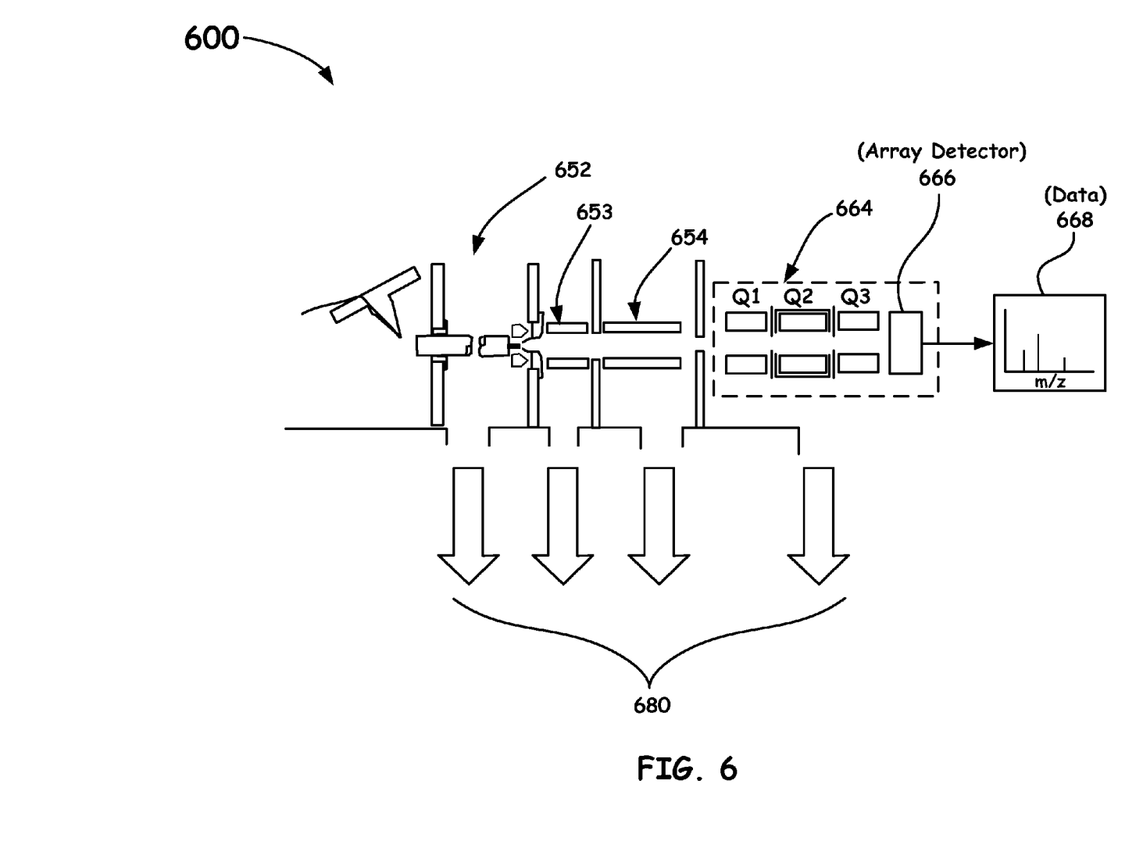
FIG. 6 shows a beneficial example configuration of a triple stage mass spectrometer system that can be operated with the imaging sensor and methods of the present invention.

Turning back to the drawings, FIG. 6 shows a beneficial example configuration of a triple stage mass spectrometer system e.g., a commercial Finnigan TSQ), as shown generally designated by the reference numeral 600 having an ultra-high speed imaging array with orthogonal readout architecture configured in the detector assembly 666 of the system. It is to be appreciated, however, that the mass spectrometer system 600 illustrated in FIG. 6 is presented by way of a non-limiting beneficial example and thus the present array-detector invention may also be practiced in connection with other mass spectrometer systems and/or other systems having architectures and configurations different from those depicted herein. Moreover and importantly, the quadrupole mass spectrometer system 600 shown in FIG. 6 differs from a conventional quadrupole mass-spectrometer in that the present invention includes the ultra-high speed imaging array with orthogonal readout architecture, position-sensitive detector assembly 666 for observing ions as they exit the quadrupole, while the latter merely counts ions without recording the relative positions of the ions.

The operation of mass spectrometer 600 can be controlled and data can be acquired by a controller and data system (not depicted) of various circuitry of a known type, which may be implemented as any one or a combination of general or special-purpose processors (digital signal processor (DSP)), firmware, software to provide instrument control and data analysis for not only the ultra-high speed array detector assembly 666 disclosed herein but also for other mass spectrometers and/or related instruments, and/or hardware circuitry configured to execute a set of instructions that enable the control of such instrumentation. Such processing of the data received from the ultra-high speed array detector assembly 666 and associated instruments may also include averaging, scan grouping, deconvolution, library searches, data storage, and data reporting.

It is also to be appreciated that instructions to the system 600, of which includes the ultra-high speed array detector assembly 666, may also include the merging of data, the exporting displaying/outputting to a user of results, etc., and may be executed via a data processing based system (e.g., a controller, a computer, a personal computer, etc.), which includes hardware and software logic for performing the aforementioned instructions and control functions of the system 600.

In addition, such instruction and control functions, as described above, can also be implemented by a mass spectrometer system 600, as shown in FIG. 6, as provided by a machine-readable medium (e.g., a computer-readable medium). A computer-readable medium, in accordance with aspects of the present invention, refers to mediums known and understood by those of ordinary skill in the art, which have encoded information provided in a form that can be read (i.e., scanned/sensed) by a machine/computer and interpreted by the machine's/computer's hardware and/or software.

Thus, as mass spectral data of a given spectrum is received by a beneficial ultra-high speed array detector assembly 666 as directed by the quadrupole 664 configured in system 600, as shown in FIG. 6, the information embedded in a computer program of the present invention can be utilized, for example, to extract data from the mass spectral data, which corresponds to a selected set of mass-to-charge ratios. In addition, the information embedded in a computer program of the present invention can be utilized to carry out methods for normalizing, shifting data, or extracting unwanted data from a raw file in a manner that is understood and desired by those of ordinary skill in the art.

Turning back to the example mass spectrometer 600 system of FIG. 6, a sample containing one or more analytes of interest can be ionized via an ion source 652 operating at or near atmospheric pressure or at a pressure as defined by the system requirements. Accordingly, the ion source 652 can include, but is not strictly limited to, an Electron Ionization (EI) source, a Chemical Ionization (CI) source, a Matrix-Assisted Laser Desorption Ionization (MALDI) source, an Electrospray ionization (ESI) source, an Atmospheric Pressure Chemical Ionization (APCI) source, a Nanoelectrospray Ionization (NanoESI) source, and an Atmospheric Pressure Ionization (API), etc.

The resultant ions are directed via predetermined ion optics that often can include tube lenses, skimmers, and multipoles, e.g., reference characters 653 and 654, selected from radio-frequency RF quadrupole and octopole ion guides, etc., so as to be urged through a series of chambers of progressively reduced pressure that operationally guide and focus such ions to provide good transmission efficiencies. The various chambers communicate with corresponding ports 680 (represented as arrows in the figure) that are coupled to a set of pumps (not shown) to maintain the pressures at the desired values.

The example system 600 of FIG. 6 is shown illustrated to also include a triple stage configuration 664 haying sections labeled Q1, Q2 and Q3 electrically coupled to respective power supplies (not shown) so as to perform as a quadrupole ion guide that can also be operated under the presence of higher order multipole fields (e.g., an octopole field) as known to those of ordinary skill in the art. It is to be noted that such pole structures of the present invention can be operated either in the radio frequency (RF)-only mode or an RF/DC mode. Depending upon the particular applied RF and DC potentials, only ions of selected charge to mass ratios are allowed to pass through such structures with the remaining ions following unstable trajectories leading to escape from the applied multipole field. When only an RF voltage is applied between predetermined electrodes (e.g., spherical, hyperbolic, flat electrode pairs, etc.), the apparatus is operated to transmit ions in a wide-open fashion above some threshold mass. When a combination of RF and DC voltages is applied between predetermined rod pairs there is both an upper cutoff mass as well as a lower cutoff mass. As the ratio of DC to RF voltage increases, the transmission band of ion masses narrows so as to provide for mass filter operation, as known and as understood by those skilled in the art.

Accordingly, the RF and DC voltages applied to predetermined opposing electrodes of the multipole devices of the present invention, as shown in FIG. 6 (e.g., Q3), can be applied in a manner to provide for a predetermined stability transmission window designed to enable a larger transmission of ions to be directed through the instrument, collected at the exit aperture by the ultra-high speed array detector 566 and processed so as to determine mass characteristics.

It is to be appreciated that ions while contained within a quadrupole instrument, e.g., Q3 of FIG. 6, with fixed initial conditions, e.g., RF and DC voltages, are desirably field-induced to follow an oscillatory trajectory having spatial beam characteristics that vary as a function of axial displacement along the length of the quadrupole. As a result, the beam traces out a spatial node pattern of narrower and wider regions along the length of the device that can be observed at the exit aperture of the instrument but has hereinbefore not been provided in the art.

However, a simplistic configuration to observe such varying characteristics with time is by way of the ultra-high speed array detector assembly 666 as disclosed herein. In effect it is to be noted that there are multiple mass ion positions at is predetermined spatial plane at the exit aperture of a quadrupole as correlated with time, each with different detail and signal intensity. To beneficially record such information, the spatial/temporal detector ultra-high speed array detector assembly 666 configurations of the present invention are in effect somewhat of a multiple pinhole array that essentially provides multiple channels of resolution to spatially record the individual shifting patterns as images that have the embedded mass content. Importantly, the present ultra-high speed array detector assembly 666 configured in the system 600 of FIG. 6 enables the acquisition of the desired ion data in the form of the one or more images as a function of RF phase at each RF and/or applied DC voltage because the applied RF and DC voltages can be configured to step or slew deterministically with the RF phase. Upon being recorded, the present invention can by controlled to thus exploit the full mass spectral content in the array of recorded image(s) by way of a constructed model that utilizes all of the information of the expected ion exit patterns.

The present invention exploits such varying characteristics by collecting the spatially dispersed ions of different m/z via the ultra-high speed array detector assembly 666 even as they exit the quadrupole 664 at essentially the same time. For example, at a given instant in time, the ions of mass A and the ions of mass B can lie in two distinct clusters in the exit cross section of the instrument. The present invention acquires the dispersed exiting ions with a time resolution on the order of 10 RF cycles, more often down to an RF cycle (e.g., a typical RF cycle of 1 MHz corresponds to a time frame of about 1 microsecond) or with sub RF cycle specificity to provide data in the form of one or more collected images as a function of the RF phase at each RF and/or applied DC voltage. Once collected, the present invention can extract the full mass spectral content in the captured image(s) of the ultra-high speed array detector assembly 566 via a constructed model that deconvolutes the ion exit patterns and thus provide desired ion signal intensities even while in the proximity of interfering signals.

Figure 7:
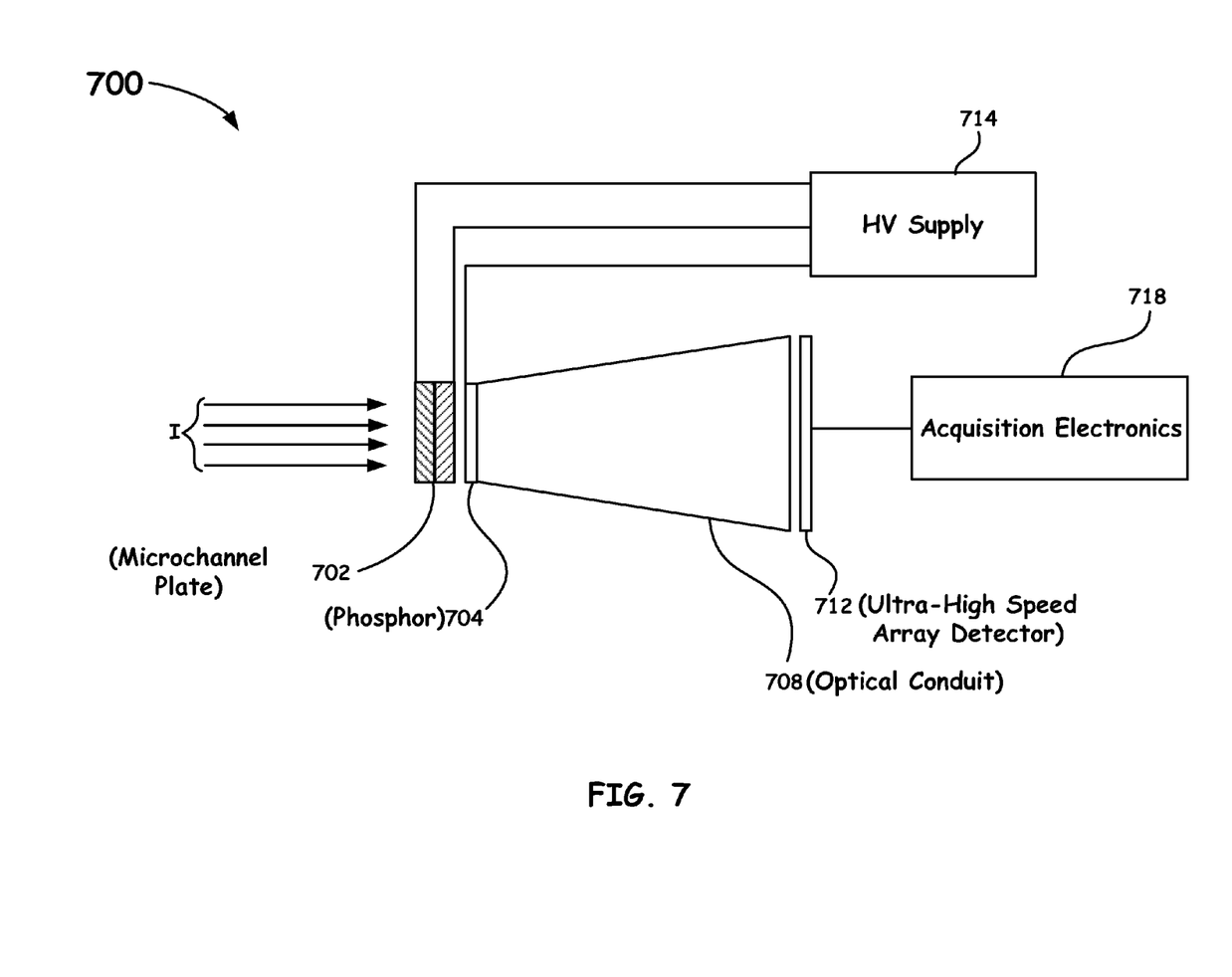
FIG. 7 shows an example beneficial desired time and position detector system as configured with the novel ultra-high speed array detector, as disclosed herein.

FIG. 7 illustrates a functional configuration, as referenced by the numeral 700, for the array detector assembly array 666 of FIG. 6. Ions from the quadrupole spectrometer impinge upon the ion-to-photon converter consisting of the microchannel plate 702 and the phosphor converter screen 704. The resulting optical output from the converter is focused onto the ultra-high-speed array detector 712 by means of an optical conduit 708. Accordingly, a time series of images representing the arrival of ions at 702 received at the ultra-high speed imaging array detector 712 (denoted as 666 in FIG. 6) can be acquired at a high temporal sampling rate because of the collapsing of the two-dimensional image into two lines of one-dimensional data: one line for the x-dimension (referred to as row) and one line for the y-dimension (referred to as column) all while the applied DC offset and RF amplitude are ramped. A deconvolution algorithm thereafter reconstructs the distribution of ion mass-to-charge ratio values that reach the detector 712 (denoted as 666 in FIG. 6), providing a "mass spectrum", actually a mass-to-charge ratio spectrum. Given the high data rate and computational requirements of the present invention, a graphics processing unit (GPU) is often used to convert the data stream into mass spectra in real time.

Having described preferred embodiments of the novel image sensor whose pixels incorporate means for simultaneous summed readout of all pixels in orthogonal fashion, which are intended to be illustrative and not limiting, it is noted that modification and variations can be made by persons skilled in the art in light of the above teachings. It is therefore to be understood that changes may be made in the particular embodiments of the invention disclosed which are within the scope and spirit of the invention defined by the following claims.

The invention claimed is:

1. An image sensor, comprising:
an array of sensor pixels, having columns and rows wherein a discrete pixel that makes up said array of sensor pixels further comprises;
a photosensitive region detecting an image,
a region integrating and storing said image,
circuitry for providing a pair of identical output signals from each of said discrete pixels that makes up said array of sensor pixels,
a plurality of column circuits configured one per each column in said image sensor and further configured to sum one of said pair of identical signals generated in a particular discrete pixel with said signal from each of a group of selected said discrete pixels in a common column for each imager column into a summed column data signal; and
a plurality of row circuits configured one per each row in said image sensor and further configured to sum a second of said pair of identical signals generated in said particular discrete pixel with said signal from each of a group of selected said discrete pixels in a common row for each imager row into a summed row data signal.

2. The sensor of claim further comprising circuitry for the storage of each of the summed column data signals, one per column; and circuitry for the storage of each of the summed row data signals, one per row.

3. The sensor of claim 1, further comprising circuitry for storage of each of the summed column data signals, one per column; circuitry for the storage of each of the summed row data signals, one per row; and a configured sensor circuitry coupled to said array and configured for outputting said one-dimensional column signal and said one-dimensional row signal.

4. The sensor of claim 3, wherein said sensor circuitry is further configured for addressing and outputting the summed electrical signal from each row in parallel for readout off-chip.

5. The sensor of claim 3, wherein said sensor circuitry is further configured for addressing and outputting the summed electrical signal from each column in parallel for readout off-chip.

6. The sensor of claim 3, wherein said sensor circuitry is further configured for addressing and outputting the summed electrical signal from each row sequentially for readout off-chip.

7. The sensor of claim 3, wherein said sensor circuitry is further configured for addressing and outputting the summed electrical signal from each column sequentially for readout off-chip.

8. The sensor of claim 1, wherein an optical multiplication device is configured to amplify the incident optical signal prior to image detection.

9. The sensor of claim 1, wherein said optical multiplication device is a micro-channel plate.

10. The sensor of claim 1, wherein said optical multiplication device is an internal semiconductor carrier amplifier.

11. A system comprising:
an optical multiplier configured to receive an incident optical signal indicative of an image so as to generate an amplified optical signal;
an array of sensor pixels, having columns and rows, wherein a discrete pixel that makes up said array of sensor pixels further comprises;
a photosensitive region detecting an image,
a region integrating and storing said image,
circuitry for providing a pair of identical output signals from each of said discrete pixels that makes up said array of sensor pixels,
a plurality of column circuits configured one per each column in said image sensor and further configured to sum one of said pair of identical signals generated in a particular discrete pixel with said signal from each of a group of selected said discrete pixels in a common column for each imager column into a summed column data signal; and
a plurality of row circuits configured one per each row in said image sensor and further configured to sum a second of said pair of identical signals generated in said particular discrete pixel with said signal from each of a group of selected said discrete pixels in a common row for each imager row into a summed row data signal;
a configured column storage circuitry for the storage of each of the summed column data signals, one per column, in a one-dimensional data format and
a configured row storage circuitry for the storage of each of the summed row data signals, one per row, in a one-dimensional data format; and
a processor configured to subject recorded spatial and temporal properties of said optical signals received by said array to deconvolution so as to extract the spectral content in said captured image.

12. The system of claim 11, wherein said optical multiplier is a microchannel plate.

13. The system of claim 11, further comprising internal semiconductor carrier amplification to amplify the incident optical signal after image detection.

14. The system of claim 11, further comprising a sensor circuitry coupled to said array and configured for outputting said one-dimensional column signal and said one-dimensional row signal.

15. The system of claim 11, wherein said sensor circuitry is further configured for addressing and outputting the summed electrical signal from each row in parallel for readout off-chip.

16. The system of claim 11, wherein said sensor circuitry is further configured for addressing and outputting the summed electrical signal from each row sequentially for readout off-chip.

17. The system of claim 11, wherein said sensor circuitry is further configured for addressing and outputting the summed electrical signal from each column in parallel for readout off-chip.

18. The system of claim 11, wherein said sensor circuitry is further configured for addressing and outputting the summed electrical signal from each column sequentially for readout off-chip.

* * * * *